United States Patent

[11] 3,543,979

| [72] | Inventors | Francis John Grove<br>Eccleston, St. Helens;<br>Donald Curtis Wright, Bolton; Francis<br>Michael Hamer, Ormskirk, Lancashire,<br>England |
|---|---|---|
| [21] | Appl. No. | 810,150 |
| [22] | Filed | March 25, 1969 |
| [45] | Patented | Dec. 1, 1970 |
| [73] | Assignee | Pilkington Brothers Limited<br>Liverpool, England<br>a corporation of Great Britain |
| [32] | Priority | March 29, 1968 |
| [33] | | Great Britain |
| [31] | | No. 15,301/68 |

[54] CUTTING OF GLASS WITH A LASER BEAM
9 Claims, 4 Drawing Figs.

[52] U.S. Cl............................................... 225/2;
219/384; 225/93, 225/96
[51] Int. Cl............................................... B26f 3/00
[50] Field of Search............................................ 225/1, 2,
93, 94, 96; 219/384

[56] References Cited
UNITED STATES PATENTS

| 3,112,850 | 12/1963 | Garibotti.................... | 225/2 |
| 3,419,321 | 12/1968 | Barber et al. ................ | 219/384UX |

FOREIGN PATENTS

| 993,705 | 6/1965 | Great Britain................ | 83/701 |

Primary Examiner—Frank T. Yost
Attorney—Morrison, Kennedy & Campbell

ABSTRACT: Glass is cut using a laser beam of a wavelength to which the glass is opaque which scans the glass to induce a stress field in the scanned strip of glass which causes a controlled fracture to run along a predetermined cutting line within that strip.

Patented Dec. 1, 1970 3,543,979
Sheet 2 of 2
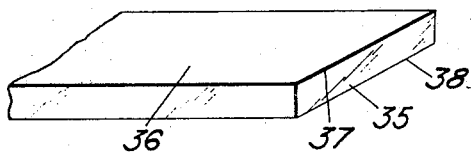
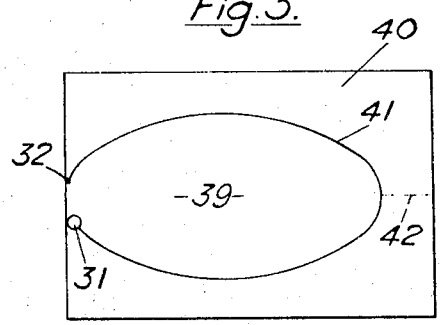
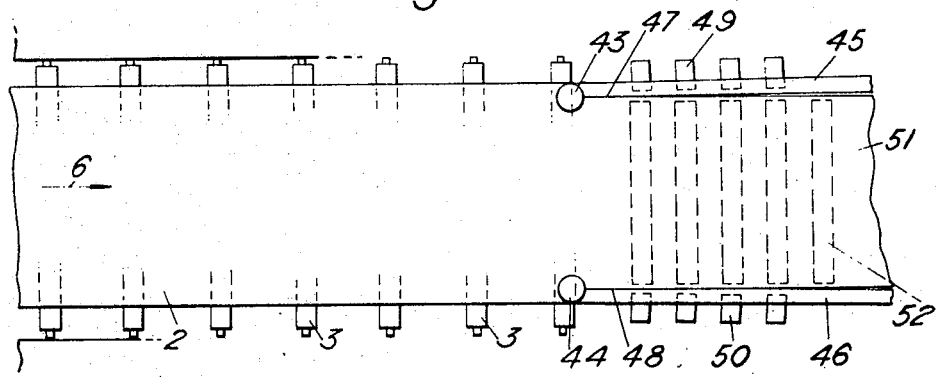
Inventors
FRANCIS JOHN GROVE,
DONALD CURTIS WRIGHT &
FRANCIS MICHAEL HAMER
By
Morrison, Kennedy & Campbell
Attorneys

3,543,979

CUTTING OF GLASS WITH A LASER BEAM

BACKGROUND OF THE INVENTION

This invention relates to methods of and apparatus for cutting glass and more especially related to the cutting of sheets of glass, either from a larger glass sheet or from glass in continuous ribbon form.

It is usual when cutting glass to score a line along one surface of the glass where the glass is to be cut, and then to subject the glass to forces acting transversely of the score line to crack the glass along the score line. In practice there is always some shelling or roughness along the cut edges of the glass, and sometimes the crack wanders away from the score line resulting in a jagged edge to the cut piece of glass.

It is a main object of the present invention to provide an improved method of and apparatus for the controlled cutting of glass which results in a new form for the face of the cut edge of a sheet of glass.

SUMMARY

According to the invention a method of cutting glass comprises directing at the glass surface a laser beam of a wavelength to which the glass is opaque, effecting relative movement between the glass and the laser beam so that a desired strip of the glass is effectively scanned by the laser beam, and selectively regulating the energy density incident on each area of the glass in said strip to induce a stress field in that strip such that a controlled fracture runs along a predetermined cutting line in that strip from a weakened point on the glass.

The stress field in a sharply defined strip embracing along the predetermined line of cutting is preferably produced by localised heating of a strip of the glass in such a way that opposed tensile stresses are induced in the glass which stresses act across that strip, and by starting the scanning from a short score mark on the glass edge or a minute notch cut in the glass edge, the controlled fracture runs along the predetermined cutting line.

A score mark may be made on the glass after it has been scanned by the laser beam and the fracture along the preferred line achieved by slightly stressing the glass, for example across a cracking roller. It is preferred however to make a score mark on the glass prior to the scanning of the glass by the laser beam.

Alternatively, the score mark may be made at the edge of the glass which is reached by the laser beam at the end of the scan, and the fracture runs back along the preferred line from the score mark. The score mark may be a weakened point on the glass surface or may be formed as a short marginal score mark on one face of the glass, or may even be scored across an edge of the glass.

It has been found that when a deep short score mark is made at an edge of the glass to be cut, or that edge is slightly notched at the beginning of the desired cutting line, the rate of propagation of the controlled fracture along the preferred cutting line is controlled by the rate of scan of the glass by the laser beam so that the head of the fracture stays with the laser beam as it traverses the glass. This accurate control of the running of the fracture enables shapes to be cut readily from a sheet of glass, for example vehicle windscreens, rear lights and side lights.

One application of the invention is for the cutting of sheets of glass from a continuous ribbon of glass for example a ribbon of float glass emerging from an annealing lehr in the float process for the manufacture of flat glass, or for the cutting of sheets of glass from the ribbon of glass emerging from the annealing tower in a process for the vertical drawing of flat glass from a body of molten glass.

The invention provides continuously advancing the ribbon of glass at a controlled rate, making a score mark on one edge of the ribbon where the glass is to be cut, and traversing the laser beam across the glass from the score mark at a rate and energy intensity such that a controlled fracture runs along the cutting line from the score mark as the laser beam traverses the glass.

The traverse of the beam across the glass is preferably at an angle to the direction of advance of the glass such that the traverse of the beam is effectively along a straight line at right angles to the sides of the advancing ribbon of glass.

The intensity of the laser beam and the rate of traverse of the beam across the glass are so related to the composition and thickness of the glass that the energy incident on the glass is sufficient to cause the fracture to run. If desired some transverse stress may be exerted across the preferred line of fracture in order to assist the propagation of the fracture.

It is usual both in the float process and in the vertical drawing of flat glass to trim the margins from the ribbon of glass emerging from the process and the invention further provides marginally trimming a continuous ribbon of glass which is continuously advancing at a controlled rate by directing laser beams at both margins of the glass at a distance from the edge of the glass corresponding to the width of the margins to be trimmed from the glass, so that controlled fractures run along both margins of the glass at a rate equal and opposite to the rate of advance of the ribbon.

The cutting of the margins from the glass ribbon takes place continuously although an initial score line may be necessary to start the cutting and some stress may be exerted to separate the margins of the glass from the central part of the ribbon.

The invention further comprehends a method of cutting glass along a desired line in which relative movement is effected between glass to be cut and a laser beam impinging on the glass, which laser beam is of a wavelength to which the glass is opaque, and the glass is separated along that line.

The invention also provides apparatus for cutting glass comprising means for supporting glass to be cut, a laser whose output wavelength is absorbed by glass, so mounted adjacent said support means that the laser output beam falls on the supported glass, means for effecting relative displacement between the glass and the laser beam so that the beam effectively traverses a predetermined line of cutting on the glass, and means for regulating the energy density incident on each area of the glass during the traverse to run a fracture along that cutting line.

The preferred apparatus according to the invention includes a conveyor for continuously conveying glass to be cut, a gas laser mounted at one side of the conveyor so that the laser output beam is directed over the conveyor, and optical scanning means mounted above the conveyor in the path of the beam so as to direct the beam on to the glass on the conveyor and cause the beam to scan across the glass.

Further according to the invention apparatus for trimming the margins from an advancing ribbon of glass includes a conveyor for continuously conveying the ribbon of glass, and two lasers mounted relative to the conveyor so that their output beams respectively fall on the glass at a distance from each edge of the glass defining the margin to be trimmed from the glass.

The invention also comprehends a cut piece of glass whose cut face is of square profile and has a mirror finish.

In this specification the term "laser" is an acronym of the words comprising the phrase "light amplification by stimulated emission of radiation". The gas laser referred to is a laser which uses a gas as the source of the radiation and the gas laser is selected to have a continuous output at a wavelength which is absorbed by the glass. That is the band width of the laser output is compatible with a resonance within the glass structure so that laser beam energy incident on the glass is absorbed within the glass structure and causes the desired tensile stresses to be induced in the glass acting across the cutting line. The preferred gas laser used is one which generates molecular line spectra in the infrared regions of the electromagnetic spectrum. Preferably the laser tube contains gaseous carbon dioxide, helium and nitrogen and a particular laser which produces an output beam whose wavelength is 10.6 microns comprises a sealed tube filled with a gas comprising one-half torr of carbon dioxide, 1 torr of nitrogen, 4 to 10 torr of helium and 0.2 torr of water vapour. A continuously operating C - N laser with an output wavelength of 333 microns can be used. Generally for cutting the usual commercial glasses a laser with an output wavelength in the range 2.5 to 500 microns may be used, and preferably the wavelength used is that at which there is maximum absorption of energy by a resonant structure in the glass.

BRIEF DESCRIPTION OF THE DRAWINGS

FIG. 2 is a perspective view of part of a piece of glass cut by the method of the invention exhibiting the square-profiled, mirror-finish cut face of the glass;

FIG. 3 illustrates the cutting of a shaped piece of glass from a sheet of glass by the method of the invention; and FIG. 4 illustrates the use of laser beams for trimming the margins from a continuous ribbon of glass.

DESCRIPTION OF THE PREFERRED EMBODIMENT

Figure 1:
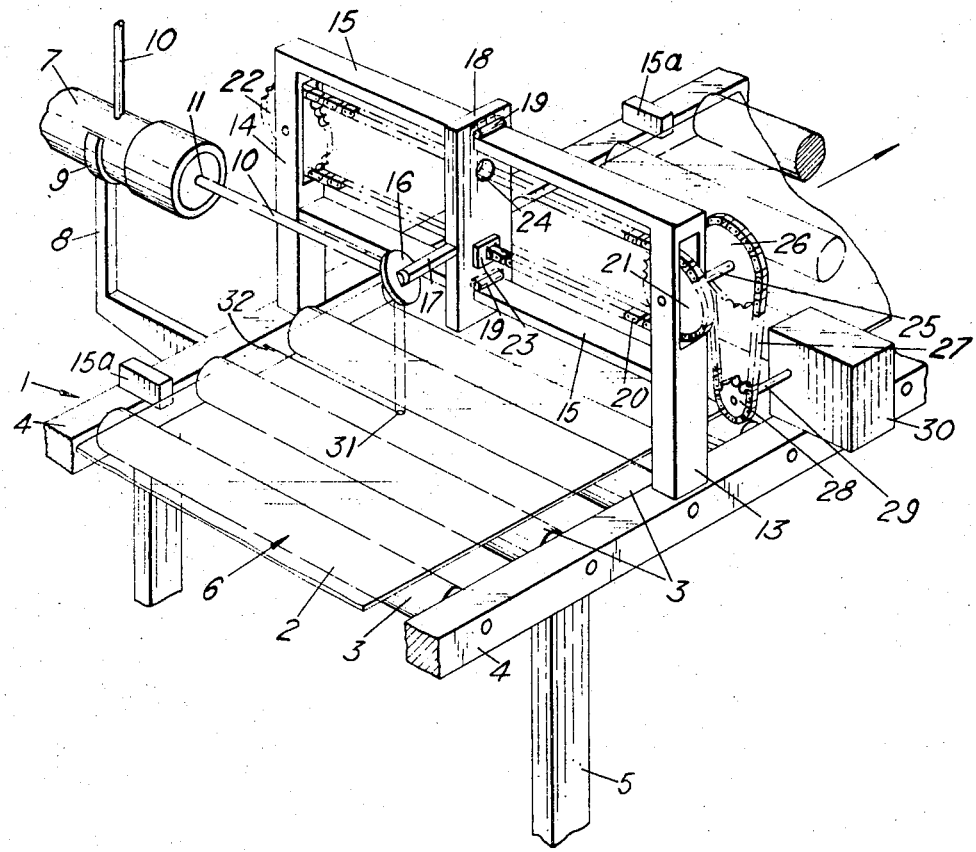
FIG. 1 is a schematic perspective view of apparatus for cutting sheets of glass from a larger piece of glass being advanced along a conveyor.

Referring to FIG. 1 a conveyor indicated by the general reference 1 for a large sheet of soda-lime-silica glass 2 comprises a plurality of rollers 3 which are journaled in bearings in side supports 4 of a conveyor support frame which is supported by legs 5. The glass is advanced along the conveyor in the direction of the arrow 6.

A carbon dioxide laser tube 7, the outlet end of which only is shown is held to one side of the conveyor by support brackets, one of which is indicated at 8. The bracket 8 is fixed to one of the side frames 4 of the conveyor and is shaped at its upper end as a cradle 9 in which the laser tube 7 rests. Regulated supplies to the laser tube are indicated generally by the reference 10. The laser tube is mounted above the conveyor so that its output beam 10 which emanates from the window 11 in one end of the laser tube is directed over the conveyor, that is across and above the ribbon of float glass 6 which is being advanced along the conveyor. The beam 10 is exaggerated for the sake of clarity.

A bridge structure constituted by two side members 13 and 14 and cross members 15 is mounted above the conveyor. The side members 13 and 14 are secured to the top faces of the side supports 4 of the conveyor. The glass is moved beneath this bridge structure, and to assist location of the ribbon on the conveyor side blocks 15a of carbon are fixed to one of the side frames of the conveyor. One edge of the glass may engage and slide against one or more of the side blocks 15a. These blocks provide some measure of transverse location of the glass to be cut and the eventual cut sheets of glass on the conveyor.

A highly reflecting mirror 16, for example a gold-plated glass mirror is mounted on an arm 17 which is connected to one edge of a carriage 18 which runs on the crossmembers 15 of the bridge 12. The carriage is provided with rollers 19 which run on the upper surfaces of the members 15 to assist the traversing of the carriage along the members 15. The carriage is displaced by means of a chain drive consisting of an endless chain 20 which extends around two sprocket wheels 21 and 22 which are respectively fixed in bearings in the side members 13 and 14 of the bridge. The lower reach of the chain 20 is fixed by means of a collar 23 to the carriage 18 and the upper reach of the chain passes freely through a hole 24 formed in the carriage. The sprocket 21 is mounted on an axle 25 which is carried by bearings, not shown, which are mounted on the side member 13 of the bridge. A further drive sprocket wheel 26 is fixed to the axle 25 and a chain drive 27 passes around the sprocket 26 and around a drive sprocket 28 fixed to an output shaft 29 of a motor 30.

Controls are provided for the motor so that the carriage is traversed in one direction across the ribbon of glass and stops when it reaches the end of its traverse. Suitable stop arrangements for example microswitches may be embodied in the apparatus to provide automatic control of the motor. After a traverse has been completed the motor is reversed to drive the carriage 18 back to its initial position ready for the next traverse.

The mirror 16 is set on its support arm 17 at an angle of 45° to the laser beam 10. The beam strikes the gold-plated front face of the mirror and is turned by it through 90° and is thereby directed downwardly on the upper face of the glass on the conveyor. The laser beam impinges on the glass to be cut and the area of incidence of the beam on the glass is indicated at 31. This area is defined by a small spot of laser energy which is absorbed in the surface of the glass, for example the spot 31 may be from 1 cm. to 1.4 cm. in diameter. The absorbed energy is redistributed by conduction through the thickness of the glass so as to thermally condition the glass.

A very short score mark indicated at 32 is made with a diamond on one edge of the ribbon of glass and when the score mark lies beneath the laser beam the glass is held stationary on the conveyor, and the motor 30 is operated to begin the traverse of the carriage 18 carrying the mirror 16 across the conveyor. The area of the spot 31, the output energy density of the laser beam 10 e.g. 100 watts and the rate of traverse of the carriage 18 across the bridge e.g. 2.5 metres per minute are selected in relation to the glass composition and thickness so that a traverse of the spot 31 across the glass thermally conditions a strip of the glass whose limits are sharply defined so as to induce thermally a stress field in that strip of the glass. The stress field is thought to take the form of opposed tensile stresses in the glass acting transversely of the scanned strip and produced by expansion of the sharply defined strip of heated glass, and causing an accurately located controlled fracture to run through the glass along the plane of maximum stress existing through the glass thickness. The head of the fracture runs with the spot 31.

The form of the fracture is illustrated in FIG. 2 which shows the cut face 35 of a piece of glass 36 which has been cut from a larger piece of glass by the method of the invention. The cut face 35 has an accurate square profile which is square-edged at its top and bottom edges 37 and 38 without any evidence of shelling or roughness such as is exhibited in the usual snapped glass, and additionally the square-cut face 35 of the glass has a mirror finish of a quality not achieved hitherto in fractured glass.

The energy density incident on each scanned area of the glass may be such that the glass is not immediately fractured, and although there is no visible change in the glass which is scanned by the spot 31, which glass is absorbing the energy of the laser beam, the glass in the scanned strip is rendered more susceptible to stresses than the remainder of the glass and after the scanned glass has passed from under the bridge stress may be applied to it for example by passing the glass over a slightly elevated breaking roll which extends upwardly from the conveyor just above the normal level of the conveyor causing the cut to run cleanly along the preferred line from the short score mark 32 at one end of that line.

The sheets of glass so cut are then advanced away from the cutting arrangement to a stacking station, while avoiding any abrasion of the cut faces of the glass against each other.

The score mark 32 is usually less than 15 mm. long and is preferably of the order of 1 to 2 mm. long or may even be a single weakened point on the glass surface. This score mark may be on the upper face of the glass as illustrated in the drawing but may be formed by a diamond wheel scoring the edge of the ribbon of glass.

The energy density of the beam which is regulated within the range 50 to 500 watts is sufficient to engender the controlled fracture. For example a 100-watt beam traversing the glass at 2.5 metres per minute runs a controlled fracture through a piece of glass 6 mm. thick.

In an alternative process the score mark is made on the glass at one end of the traversed strip of glass after the traverse has been completed, and bending forces are then applied to the glass and the fracture runs along the preferred cutting line.

In another way of operating the score mark 32 is formed as already described at an edge of the glass but the laser beam is traversed towards that score mark so that the desired line of cutting has already been defined in the glass before the score mark is reached by the beam, and the glass fractures when the laser beam reaches the score mark.

The energy of the laser beam and the rate of traverse of the spot over the glass surface is such that the cut is run along the preferred cutting line by the action of the laser beam. The laser beam energy is absorbed in a sharply defined region of the glass and it has been found that the head of the cut is held to the immediate vicinity of the spot 31 on the glass. Control of the location of the head of the cut is thus effected and shaped cuts can be made in the glass. This is particularly advantageous in the cutting out of glass shapes for example for vehicle windows.

In order to cut a shaped piece of glass from a sheet of glass the laser beam may be moved in a desired path over the glass surface by a system of two rotating mirrors for example which rotate about axes at right angles to each other. For example as shown in FIG. 3 an oval-shaped piece of glass 39 is cut from a sheet of glass 40 by traversing the laser beam spot 31 from a short score mark 32 on one edge of the glass sheet. The spot 31 describes the oval 41 and runs the fracture around that oval back to the initial score mark 32. The breaking out of the cut oval 39 from the sheet 40 may be facilitated by running a fracture indicated at 42 from the opposite edge of the oval to the edge of the glass sheet.

Alternatively the laser beam may be stationary and the glass sheet 40 is moved through a desired path to run the shaped fracture through the glass.

The invention is especially applicable to the cutting of sheets of glass from the end of a continuous ribbon of glass produced for example by the float process or by a vertical drawing process.

The conveyor assembly of FIG. 1 may extend from the outlet of an annealing lehr through which a ribbon of float glass is being advanced in the direction of the arrow 6 at a rate of 2.5 metres per minute for example. The bridge 12 is inclined to the direction of advance of the ribbon at an angle such that, for a given rate of traverse of the laser beam over the glass, the component of velocity of the carriage 18 along the members 15 in the direction of advance of the glass is the same as the rate of advance of the glass. The fracture is thus run at right angles to the edges of the ribbon. The conveyor rollers downstream of the bridge may be driven faster than the upstream part of the conveyor so that the severed sheet of glass is accelerated away from the end of the ribbon and there is no possibility of abrasion of the cut surfaces.

The laser beam spot may be stationary and be directed onto glass which is moved relative to the stationary spot in the direction of the fracture. For example in the application of the invention to the trimming of the margins from a ribbon of glass either a ribbon of float glass on a conveyor as illustrated in the drawing or in a vertical drawing process, stationary lasers may direct beams at both margins of the glass at a distance from the edge of the glass corresponding to the width of the margins to be trimmed from the glass.

The trimming of the margins from a ribbon of float glass is illustrated in FIG. 4.

After leaving the annealing lehr and before being cut transversely into sheets, the ribbon of float glass 2 is advanced beneath two laser tubes 43 and 44 which are directed downwardly so that their beams, not shown, respectively impinge on the inner boundaries of the margins 45 and 46 to be trimmed from the ribbon 2. The heads of the two running fractures 47 and 48 along the margins of the glass are held stationary by the laser beams. In effect the controlled fractures 47 and 48 run along the margins of the glass ribbon at a rate equal and opposite to the rate of advance of the ribbon in the direction of arrow 6.

Skewed rollers 49 and 50 constitute the edges of the conveyor downstream of the lasers 43 and 44, and ease the trimmed margins 45 and 46 away from the central part 51 of the ribbon which is advanced on rollers 52 for transverse cutting, thereby avoiding abrasion of the mirror-finish, square-profiled, cut side faces of the ribbon by the trimmed-off margins. The cuts so produced may be running cuts, the positions of whose heads remain stationary at the position of impingement of the laser beams of the glass. The trimmed margins can thus be easily removed from the central part of the ribbon of glass.

Any suitable arrangement may be employed for causing the linear or shaped traverse of the laser beam spot over the glass surface. For example a system of rotating highly reflective mirrors may be employed in place of the mirror 16 to cause scanning of the spot 31 over an advancing ribbon of glass without the employment of a movable carriage. In order to provide additional control of the energy density in the spot 31 the geometry of the spot can be selectively varied e.g. by an appropriate optical system of mirrors. For example the size of the spot 31 may be varied by alternating the focusing of the laser beam onto the glass surface, or the shape of the laser may be altered, to give a triangular spot for example.

Although particularly described with reference to the cutting of sheets of glass it will be appreciated that a laser beam cutting arrangement according to the invention can be applied to the cutting of glass in other forms, for example wired glass, or rolled glass sections for use in the building industry, or for the cutting of glass tubes from the end of a continuous glass tube forming process.

Usually the glass is cut at or near room temperature, although the method of the invention may be applied to the cutting of glass at a higher temperature, below the annealing temperature, so long as the temperature of the glass is such as to permit the appropriate stress field is induced in the glass to cause the glass to fracture along the plane of maximum stress. For example the invention can be applied to the trimming of the margins from a ribbon of glass in the annealing lehr and indeed sheets of glass may be cut from a ribbon advancing through the lehr, even at temperatures up to 450° C. The presence of some random stresses in the glass which would be removed as the annealing process is completed does not affect the accuracy of the fracture or the quality of the cut faces of the glass.

We claim:

1. A method of cutting glass comprising directing at the glass surface a laser beam of a wavelength to which the glass is opaque, effecting relative movement between the glass and the laser beam so that a desired strip of the glass is effectively scanned by the laser beam, and selectively regulating the energy density incident on each area of the glass in said strip to induce a stress field in that strip such that a controlled fracture runs along a predetermined cutting line in that strip from a weakened point on the glass.

2. A method according to claim 1, including making a score mark on the glass at one end of said line prior to the scanning of the glass by the laser beam.

3. A method according to claim 2, for cutting sheets of glass from a continuous ribbon of glass, comprising continuously advancing the ribbon of glass at a controlled rate, making a score mark on one edge of the ribbon where the glass is to be cut, and traversing the laser beam across the glass from the score mark at a rate and energy intensity such that a controlled fracture runs along that cutting line from the score mark as the laser beam traverses the glass.

4. A method according to claim 1, of marginally trimming a continuous ribbon of glass, comprising continuously advancing the ribbon of glass at a controlled rate and directing laser beams at both margins of the glass at a distance from the edge of the glass corresponding to the width of the margins to be trimmed from the glass, so that controlled fractures run along both margins of the glass at a rate equal and opposite to the rate of advance of the ribbon.

5. A method of cutting glass along a desired line, in which relative movement is effected between glass to be cut and a laser beam impinging on the glass, which laser beam is of a wavelength to which the glass is opaque, and the glass is separated along that line.

6. Apparatus for cutting glass comprising means for supporting glass to be cut, a laser whose output wavelength is absorbed by glass, mounted adjacent said support means so that the laser output beam falls on the supported glass, means for effecting relative displacement between the glass and the laser beam so that the beam effectively traverses a predetermined line of cutting on the glass, and means for regulating the energy density incident on each area of the glass during the traverse to run a fracture along that cutting line.

7. Apparatus according to claim 6, including a conveyor for continuously conveying glass to be cut, a gas laser mounted at one side of the conveyor so that the laser output beam is directed over the conveyor, and optical scanning means mounted above the conveyor in the path of the beam so as to direct the beam onto glass on the conveyor and cause the beam to scan across the glass.

8. Apparatus according to claim 6, for trimming the margins from an advancing ribbon of glass, including a conveyor for continuously conveying the ribbon of glass, and two lasers mounted relative to the conveyor so that their output beams respectively fall on the glass at a distance from each edge of the glass defining the margin to be trimmed from the glass.

9. A piece of glass cut by a method according to claim 1, whose cut face is of square profile and has a mirror finish.